United States Patent Office 2,805,210
Patented Sept. 3, 1957

2,805,210

RUBBER LATEX COMPOSITIONS HEAT-SENSITIZED WITH POLYALKOXY-1-ALKANOLS

George G. Stoner, Easton, Pa., Julian L. Azorlosa, Westbury, N. Y., and Charles P. Albus, Easton, Pa., assignors to General Aniline & Film Corporation, New York, N. Y., a corporation of Delaware No Drawing. Application September 9, 1955, Serial No. 533,527

12 Claims. (Cl. 260—29.7)

This invention relates to natural rubber latex compositions which are heat-sensitized with polyalkoxy-1-alkanols.

In the rubber art, articles such as gloves, fountain pen sacks, bathing caps, meteorological balloons, sponge rubber, etc., have generally been produced by either a (1) straight dip, (2) coagulating dip, (3) gel-dipping, (4) molding, or (5) heat-sensitized latex process.

In the heat-sensitized latex process, a rubber latex is rendered heat-sensitive by the addition of inorganic or organic compounds. An impermeable hot form or mold is then dipped into the latex, held for a period of time to obtain a coagulate of the desired thickness, withdrawn from the latex, dried, washed in water to remove the water-soluble materials, dried, and cured. The heat-sensitized latices may be poured into molds which are subsequently heated to coagulate the latex. They may also be used for impregnating porous materials, such as paper, cloth, etc., squeezed to remove excess latex, and then coagulated by heat which also dries the impregnated article.

Many inorganic materials such as soluble bivalent and trivalent metal salts, mixture of zinc oxide and an ammonium salt of a strong acid, ammonium persulfate, sodium silicofluoride, and organic materials such as trimethyl cellulose, proteins of animal or vegetable origin and their degradation products, e. g., egg albumen, organic colloids such as gelatin; organic colloids such as celluloses, hemicelluloses, polysaccharides, viscose, etc., disubstituted guanidine, and nitroparaffins of 1 to 6 carbon atoms have been proposed as heat-sensitizers for rubber latex.

The foregoing heat-sensitizers have not come into common use because of one or more defects. Latices containing additions of inorganic salts such as ammonium nitrate, calcium chloride, etc., tend to coagulate prematurely and to corrode storage drums and dipping pots. Proteins, gelatin, polysaccharides, and similar materials are subject to bacterial attack, and generally seem to do little more than concentrate or cream latex when used as heat-sensitizers. Nitroparaffins are ineffective alone and are used in conjunction with zinc oxide or oxides and hydroxides of elements of periods 2-6 of group II of the periodic table. In addition, these materials appear to be rather slow in their action as heat-sensitizers.

It is an object of this invention to provide heat-sensitized natural and synthetic rubber latex compositions which are stable on storage and non-corrosive to storage drums and dipping pots.

Another object is to provide heat-sensitized natural and synthetic rubber latex compositions which will readily coagulate around a form heated to temperatures of 30 to 130° C. within an extremely short period of time.

A further object is to provide a heat-sensitized natural and synthetic rubber latex composition which will yield relatively thick coagulates when contacted with a suitable hot form, either by immersion of the form in the latex for a very short period or by adding the composition to a hollow form or mold which is subsequently heated.

Other objects and advantages will become more clearly apparent from the following description.

We have found that the foregoing objections to the prior art heat-sensitizers are in large measure overcome through the use of water-soluble polyalkoxy-1-alkanols, or mixtures thereof, having the following general formula

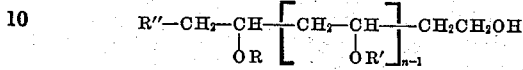

where R and R' represent a lower alkyl or 1-alkoxyalkyl group, which may be the same or different, e. g. methyl, ethyl, propyl, butyl, etc., methoxyethyl, methoxypropyl, methoxybutyl, ethoxyethyl, ethoxypropyl, ethoxybutyl, propoxyethyl, propoxybutyl, butoxyethyl, butoxypropyl, etc., R'' represents either hydrogen, a lower alkyl or a 1-alkoxyalkyl of the same values as in R and R', and $n$ is an integer ranging from 1 to 40.

The polyalkoxy-1-alkanols are readily prepared in the conventional manner by the simultaneous saponification and hydrogenation of the corresponding polyalkoxy acetals as described in U. S. P. 2,165,962. The polyalkoxy-1-alkanols may also be readily prepared by the simultaneous hydrolysis and reduction of the corresponding polyalkoxy acetals as described in U. S. P. 2,618,663. In the latter process, the reaction is carried out in aqueous solution at a pH of 4.5 to 5.5 using a hydrolyzable metal salt of mineral or organic acids as a catalyst in conjunction with Raney nickel catalyst and hydrogen at temperatures of 75° to 90° C. and 600 to 1000 p. s. i. hydrogen pressure.

It is believed that the polyalkoxy acetal is first hydrolyzed to the corresponding aldehyde and that this is then reduced to the corresponding alcohol in the following manner:

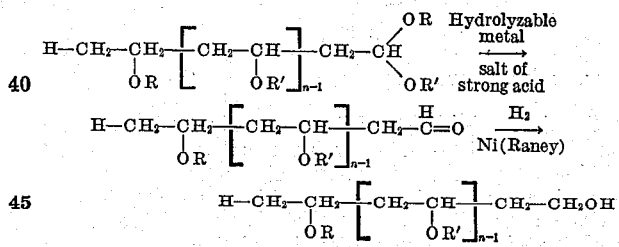

wherein R, R' and $n$ have the same value as above.

The polyalkoxy alcohols are also easily prepared as mixtures from the corresponding mixed polyalkoxy acetals. For example, when 3 moles of methyl vinyl ether are reacted with one mole of methanol in the presence of boron trifluoride, the following mixed polyalkoxy acetals are formed:

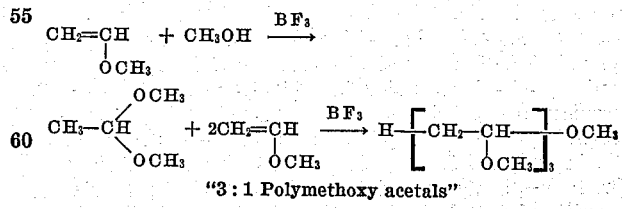

"3 : 1 Polymethoxy acetals"

This may be written also as:

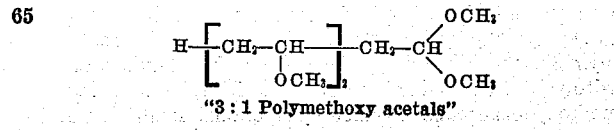

"3 : 1 Polymethoxy acetals"

Simultaneous hydrolysis and reduction of the mixed polyalkoxy acetals as shown above yields the following mixed polymethoxy alcohols:

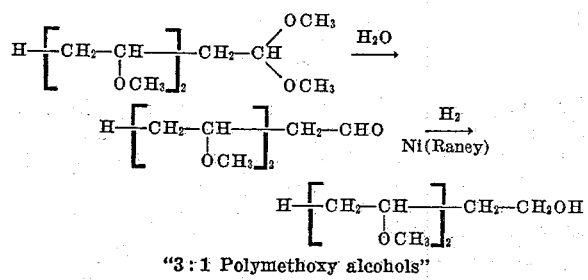

"3:1 Polymethoxy alcohols"

However, the latter formula represents only the average composition of the 3:1 polymethoxy alcohols formed by the hydrolysis and reduction of 3:1 polymethoxy acetals. It is to be noted that in practice they are obtained as a mixture having the following approximate composition:

1. 35% 3-methoxy-1-butanol

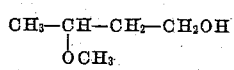

2. 30% 3,5-dimethoxy-1-hexanol

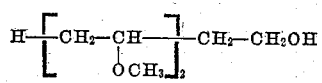

3. 20% 3,5,7-trimethoxy-1-octanol

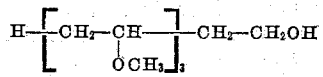

4. 10% 3,5,7,9-tetramethoxy-1-decanol

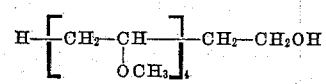

5. 5% higher polymethoxy-1-alkanols

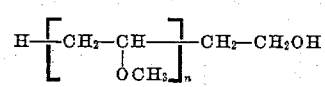

where $n$ is greater than 4.

Fractional distillation of the above mixture by conventional means yields the individual members.

Although polyalkoxy acetals, individually or in admixture, yield good results as heat sensitizers, the polyalkoxy-1-alkanols per se and mixtures thereof as employed in accordance with the present invention display the outstanding property of being more readily washed out by water from the rubber composition after heat sensitization. Moreover, the said polyalkoxy-1-alkanols are less soluble in the finished rubber compositions than the corresponding polyalkoxyacetals.

Individual members of the lowest homologous series of the polyalkoxy alcohols, polymethoxy alcohols, as disclosed in U. S. P. 2,618,663 are as follows: 3-methoxy-1-butanol, 3,5 - dimethoxy-1-hexanol, 3,5,7-trimethoxy-1-octanol, 3,5,7,9-tetramethoxy-1-decanol, 3,5,7,9,11-pentamethoxy - 1 - dodecanol, 3,5,7,9,11,13 - hexamethoxy - 1 - tetradecanol, 3,5,7,9,11,13,15 - heptamethoxy - 1 - hexadecanol, 3,5,7,9,11,13,15,17-octamethoxy-1-octadecanol, and in general 3,5 . . . (2n−1)-polymethoxy-1-alkanols (where $n$=the number of moles of methyl vinyl ether used per mole of methanol to form the polymethoxy-1-alkanol). The number of methoxy groups present in the polymethoxy-1-alkanol will be $n-1$. The number of carbon atoms in the polymethoxy-1-alkanol will be $2n$. For instance, the polymethoxy-1-alkanol obtained from the simultaneous hydrolysis and reduction of 1,1,3,5,7,9,11,13,15-nonamethoxyhexadecane (isolated by fractional distillation of the reaction product from 8 moles of methyl vinyl ether and one mole of methanol) has the structure:

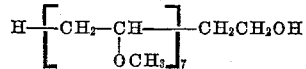

and the name of this individual member is 3,5,7,9,11,13,15-heptamethoxy-1-hexadecanol.

Higher homologs of the polymethoxy-1-alkanols, such as the polyethoxy-1-alkanols, polypropoxy-1-alkanols, etc., may be similarly defined. For example, the polyethoxy-1-alkanol obtained by the simultaneous hydrolysis and reduction of 1,1,3,5,7,9-hexaethoxydecane (produced from 5 moles of ethyl vinyl ether and one mole of ethanol) has the structure:

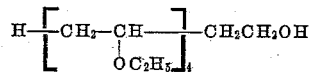

and the name of this individual member of the polyethoxy-1-alkanol series is 3,5,7,9-tetraethoxy-1-decanol. Similarly, the polyalkoxy-1-alkanol obtained when 5 moles of methoxyethyl vinyl ether are reacted with one mole of ethylene glycol monomethyl ether has the structure:

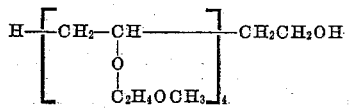

and the name of this homolog is 3,5,7,9-tetra(2-methoxyethoxy)-1-decanol. In like manner, the polyalkoxy-1-alkanol produced from 2 moles of n-octyl vinyl ether and one mole of n-octanol has the structure:

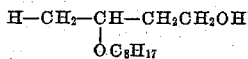

and the name of this individual member of this series is 3-octyloxy-1-butanol.

It is to be understood that the polyalkoxy-1-alkanols may be used as the individual members starting with the lowest member of the homologous series, such as 3-methoxy-1-butanol for the 3,x-polymethoxy-1-alkanol series, as mixtures of 3,x-polyalkoxy-1-alkanols, or mixed 3,x-polyalkoxy-1-alkanols may be "topped" or distilled so as to remove the lower-boiling 3,x-polyalkoxy-1-alkanols and either the low or high boiling fraction may be used as heat sensitizers for natural rubber latex.

It is to be further understood that we are not limited to the polyalkoxy-1-alkanols listed above. The many individual members and mixtures of water-soluble polyalkoxy-1-alkanols which can be obtained when 1 to 40 moles of mixed alkyl vinyl ethers are reacted with one mole of an acetal or alkanol and subsequently hydroylzed and reduced to form polyalkoxy-1-alkanols are equally useful as heat-sensitizers for natural rubber latex.

The polyalkoxy-1-alkanols are colorless to yellow-colored, fluid to fairly viscous liquids characterized by complete miscibility in water, aliphatic alcohols, ketones, esters, glycol ethers, etc. The water-solubility seems to decrease as the molecular weight of the ether groups is increased. For example, the polymethoxy-1-alkanols appear to be somewhat more water-soluble than similar polybutoxy—or high polyalkoxy-1-alkanols. In addition, these materials have the rather novel property of being soluble in cold water and precipitating out of solution as the temperature is raised.

In carrying out the invention, about 0.5 to 3% of a conventional stabilizing agent is first added to natural rubber latex to prevent coagulation of the latex on the addition of acid. The pH of the latex is then lowered to a value of 7.5 or other value as desired by the addition of any one of the various inorganic or organic acids. The filler, vulcanizing agents, color, and other compounding ingredients are then added as a dispersion, and lastly, 2 to 10%, and preferably 4 to 6% of polyalkoxy-alkanols are added. The latex is stirred or agitated by some suitable means as each addition is made to ensure complete solution or blending of each ingredient. After the polyalkoxy alkanols are added, stirring is continued for a few minutes.

The latex is now heat-sensitized and may be immediately used or allowed to stand for 12 to 24 hours. In some instances, it has been found that a slight "ripening" action, as evidenced by a slight or moderate decrease in the coagulation point of the heat-sensitized latex, may occur when the latex is allowed to stand for a period of 12 to 24 hours. In either instance, it is advantageous to determine the coagulation point of the heat-sensitized latex after preparation and after storage for 12 to 24 hours. This will not only give the minimum temperature to which a form must be heated before it is inserted into the latex to obtain a coagulate but also indicate storage temperatures which will cause premature coagulation of the compounded latex. For example, we have found that natural rubber latices heat-sensitized by the addition of polyalkoxy-1-alkanols should be stored at temperatures at least 10 to 15° C. below the coagulation point of the latex to prevent premature coagulation. However, for best results, storage temperatures of 20 to 25° C. are preferred.

The coagulation point is easily determined as follows: 10 to 15 ml. of the heat-sensitized latex is poured into a 20 x 150-mm. Pyrex test tube and a thermometer inserted. A 400-ml. dye beaker is half to three-fourths filled with cold water and placed on a hot plate. The test tube containing the latex and thermometer is then inserted into the water contained in the beaker and the hot plate turned on. The temperature of the latex is allowed to rise 2 to 5° C. per minute. At the same time, the latex is intermittently stirred with the thermometer to prevent too great a temperature lag. The coagulation point is taken as the temperature at which all of the heat-sensitized latex coagulates into a solid mass of rubber. Coagulation of the latex into a solid mass of rubber appears to occur almost instantaneously at a given temperature and does not occur over a wide temperature range.

The natural rubber latex used may consist of purified, creamed, centrifuged, filtered, evaporated, or crude (plantation) latex. The natural rubber latex may be "de-ammoniated" by blowing or any other suitable means to reduce the ammonia content before use. However, it is to be understood that we are not limited to the use of natural rubber latex. Synthetic rubber latices such as emulsions of polymerization products of 1,3-butadiene or mixtures of 1,3-butadiene with other polymerizable olefins or diolefins, alpha-methylene carboxylic acids and their esters, nitriles, amides, etc., and including polymerized 2-chloro-1,3-butadiene or like materials which when properly compounded and on the addition of polyalkoxy alkanols show a similar tendency to become heat-sensitive.

The stabilizer is added in an amount sufficient to prevent coagulation of the latex when the pH is lowered to a value of about 7.5 or some higher desired value. For centrifuged natural rubber latex, we have found that generally additions of stabilizer ranging from about 0.5 to about 3%, and preferably from 0.5 to 1.5%, based on the total solids of the latex, is sufficient to stabilize the latex to additions of various strong acids, such as 1 N sulfuric, acetic, etc., acids. As the amount of stabilizer added is progressively increased over the minimum amount necessary to stabilize the latex to additions of acid, the coagulation point and stability of the heat-sensitized latex will also increase until a point is reached when the latex is over-stabilized and no longer able to coagulate around a hot mold or form dipped into the latex. For this reason, there is little or no advantage to be gained by adding any more stabilizer than the minimum amount necessary to stabilize the latex to additions of acid and help impart the necessary storage stability.

Rubber latex stabilizers are numerous and have been described in the patent literature. For the purpose of the present invention, we prefer for the sake of expediency to employ those stabilizing agents disclosed in the third and fourth columns of U. S. P. 2,446,115 including the reaction product of ethylene oxide and oleyl alcohol in the mole ratio of 20:1. Alkylphenoxypolyoxyethylene-ethanols, condensation products of an alkylnaphthol with 8 moles of ethylene oxide as described in U. S. P. 1,970,578 and 2,213,477, may be used. All of these stabilizers are effective in preventing coagulation of natural rubber latex upon the addition of strong acids.

Various inorganic and organic acids may be used for lowering the pH of natural rubber latex. Examples of such acids are hydrochloric, nitric, phosphoric, sulfuric, acetic, formic, oxalic, tartaric and glycolic acid, etc. Various acid salts which are used in the art for lowering the pH of rubber latices may also be used. In addition, an aldehyde, such as formaldehyde, which is used to reduce the pH of rubber latices, such as natural rubber latex, may also be used. It is to be noted that as less acid is used the coagulation point and stability of the latex increases. For some applications this may be highly desirable. However, for the purpose of the present invention, especially when employing the polyalkoxy alkanols, the pH may be lowered from its original value to 9.0, 8.0, 7.5, or any intermediate value by the addition of either sulfuric acid, or any of the above-mentioned acids or acid salts. However, if the pH value of the latex is too high after the acid is added, no heat-sensitization will occur when the polyalkoxy alkanols are added.

The vulcanizing dispersion may be any one of the type commonly used in the art for natural rubber latex and contain filler, vulcanizer, accelerator, anti-oxidant, plasticizer, color, and other compounding ingredients. The only limitation is that such auxiliary materials do not cause coagulation of the latex when they are added. A typical vulcanizing dispersion which has been found satisfactory consists of:

| | Parts |
|---|---|
| Kaolin | 200 |
| Zinc oxide | 100 |
| Sulfur | 60 |
| Mercaptobenzothiazole | 20 |
| Sodium salt of a sulfonated naphthalene-formaldehyde condensate | 20 |
| Water | 600 |

All the parts given are by weight.

Another example of a satisfactory vulcanizing dispersion suitable for natural rubber latex which was used in Examples 1–3 consists of:

| | Parts |
|---|---|
| Zinc oxide | 450 |
| Sulfur | 90 |
| Zinc dimethyldithiocarbamate | 45 |
| Sodium salt of a sulfonated naphthalene-formaldehyde condensate | 45 |
| Distilled water | 945 |

The polyalkoxy-1-alkanols, either as the individual homolog or mixtures thereof, are lastly added to natural rubber latex, and compounded as previously described, generally in a concentration of 2 to 10%, but preferably 4 to 6%, so as to heat-sensitize the latex. Amounts lower than 2% will either fail to heat-sensitize the latex or else give unsatisfactory coagulates. Excessive additions of the polymethoxy alkanols serve no particularly useful purpose.

The following examples are given to illustrate the new and unexpected properties of the heat-sensitizers of the present invention and the efficacy with which they cause rubber latex to deposit or coagulate rather thick films of rubber onto a hot form immersed in the latex.

EXAMPLE I

Eight compositions with one control were prepared as shown in Table 1. It is to be noted that all components entering the nine compositions were weighed out in grams with the exception of the sulfuric acid which as noted is in milliliters.

*Table 1.—Use of mixed polyalkoxy-1-alkanols as heat-sensitizers for rubber latex*

| Composition | 1 | 2 | 3 | 4 | 5 | 6 | 7 | 8 | 9 |
|---|---|---|---|---|---|---|---|---|---|
| Natural Rubber Latex [1] | 161.7 | 161.7 | 161.7 | 161.7 | 161.7 | 161.7 | 161.7 | 161.7 | 161.7 |
| 10% Polyoxyethylated Oleyl Alcohol [2] | 15 | 15 | 15 | 15 | 15 | 15 | 15 | 15 | 15 |
| pH | 10.18 | 10.16 | 10.16 | 10.18 | 10.18 | 10.17 | 10.15 | 10.17 | 10.17 |
| 0.9954 N Sulfuric Acid (mls.) | 59.1 | 59.8 | 59.0 | 59.8 | 59.5 | 58.4 | 59.6 | 60.2 | 59.6 |
| pH | 7.62 | 7.62 | 7.60 | 7.62 | 7.62 | 7.60 | 7.62 | 7.62 | 7.61 |
| 40% Vulcanizer Dispersion | 17.5 | 17.5 | 17.5 | 17.5 | 17.5 | 17.5 | 17.5 | 17.5 | 17.5 |
| 3:1 Polymethoxy Alcohols | | 6 | | | | | | | |
| 5:1 Polymethoxy Alcohols | | | 6 | | | | | | |
| 10:1 Polymethoxy Alcohols | | | | 6 | | | | | |
| 15:1 Polymethoxy Alcohols | | | | | 6 | | | | |
| 20:1 Polymethoxy Alcohols | | | | | | 6 | | | |
| 5:1 Polyethoxy Alcohols | | | | | | | 6 | | |
| 10:1 Polyethoxy Alcohols | | | | | | | | 6 | |
| 15:1 Polyethoxy Alcohols | | | | | | | | | 6 |
| pH | 7.72 | 7.72 | 7.71 | 7.72 | 7.72 | 7.72 | 7.71 | 7.75 | 7.72 |
| Coagulation Point °C.: | | | | | | | | | |
| After Preparation | 60 | 49 | 48 | 40 | 39 | 38 | Flocc. | 45 | 48 |
| After 24 Hours at Room Temperature | 60 | 48 | 47 | Flocculated | 37 | | Flocculated | | |

[1] Centrifuged natural rubber latex; percent solids=61.85.
[2] The reaction product of ethylene oxide and oleyl alcohol in the mole ratio of 20:1.

I. APPEARANCE OF LATEX

After preparation:
 1–6. Good; fluid; smooth.
 7. Flocculated on continued stirring shortly after the 5:1 polyethoxy alcohols were added.
 8–9. Good; fluid; smooth.

After 24 hours at room temperature:
 1–3. Good; fluid; smooth.
 4. Flocculated even after shaking.
 5. Flocculated until shaken then good, fluid, smooth.
 6. Flocculated even after shaking.
 7. Flocculated; coagulated on being shaken.
 8–9. Flocculated even after shaking.

II. APPEARANCE OF COAGULATE

After preparation:
 1–6. Good; fairly strong; smooth coagulate; not too easily pulled apart by hand.
 8–9. Good; fairly strong; smooth coagulate; not too easily pulled apart by hand.

After 24 hours at room temperature:
 1–3. Good; fairly strong; smooth coagulate; not too easily pulled apart by hand.
 5. Good; fairly strong; smooth coagulate; not too easily pulled apart by hand.

The centrifuged natural rubber latex was weighed into a tared 400-ml. glass beaker following which 15 grams of the 10% solution of polyoxyethylated oleyl alcohol was added. The latex was then placed on a ring stand, and a stainless steel stirrer attached to a variable-speed motor was inserted into the latex. Stirring was then begun. The electrode leads of a Beckman pH meter were inserted into the latex and the motor turned on. Sulfuric acid (0.9954 N) was added dropwise from a burette to a pH of 7.6. The vulcanizer dispersion was then added by difference from a 30-ml. beaker following which the polyalkoxy-1-alkanols were also added by difference from a 30-ml. beaker. The pH of the latex was determined after each addition. The latex composition was stirred for several minutes after the polyalkoxy-1-alkanols were added and then poured into an 8-oz. bottle, capped and labeled. The coagulation point was determined after preparation and after standing at room temperature for 24 hours.

After preparation, the coagulation point of the various compounded latices heat-sensitized by additions of 6% of various mixed polymethoxy- and polyethoxy-1-alkanols (based on 100 parts of latex solids) ranged from 38 to 49° C. In one instance, the coagulation point of the heat-sensitized latex was apparently so low as to cause flocculation at room temperature. By comparison, a control sample prepared in exactly the same way but containing no polymethoxy- or polyethoxy-1-alkanol had a coagulation point of 60° C. which is generally considered too high for a satisfactory heat-sensitized latex.

Dipping tests carried out on these compositions show that addition of 6% polymethoxy- or polyethoxy-1-alkanols to a compounded rubber latex produces coagulates which are somewhat thicker and of better appearance than those obtained from a control containing no polyalkoxy-1-alkanols.

*Dipping tests*

APPEARANCE OF COAGULATES

| Composition | Appearance |
|---|---|
| 1 | 1/32–1/16 inch thick; thin, drippy, smooth coagulate. Seems to be little more than a thin skin on the tube. |
| 2–3 | 1/16–1/8 inch thick; thick, smooth, non-drippy coagulate. Much better than 1. |
| 4 | Flocculated; not run. |
| 5 | 1/16–1/8 inch thick; thick, smooth, non-drippy coagulate. Much better than 1. |
| 6–9 | Flocculated; not run. |

MODE OF PREPARATION

A 20 x 150-mm. Pyrex test tube was half-filled with glycerine and a thermometer inserted. The test tube and contents were heated over a gas flame to a temperature of 90° C., immersed in the latex, which had been allowed to stand at room temperature for 24 hours, held for 30 seconds in the latex, and then withdrawn. Bottom temperature on withdrawing the test tube from the latex ranged from 79 to 82° C.

EXAMPLE II

The compositions listed in Table 2 were prepared in the same manner as given in Example I. However, in this case slightly more stabilizer was used to increase the coagulation point of the heat-sensitized latices. The latices were also stored for 24 hours in a refrigerator at 0–5° C. to prevent premature coagulation of the latices. All parts are in grams unless otherwise noted.

Table 2.—*Use of mixed polyalkoxy-1-alkanols as heat-sensitizers for rubber latex*

| Composition | 1 | 2 | 3 | 4 | 5 | 6 | 7 | 8 | 9 |
|---|---|---|---|---|---|---|---|---|---|
| Natural Rubber Latex | 161.7 | 161.7 | 161.7 | 161.7 | 161.7 | 161.7 | 161.7 | 161.7 | 161.7 |
| 10% Polyoxyethelated Oleyl Alcohol | 20 | 20 | 20 | 20 | 20 | 20 | 20 | 20 | 20 |
| pH | 10.19 | 10.19 | 10.18 | 10.16 | 10.16 | 10.18 | 10.16 | 10.17 | 10.18 |
| 0.9954 N Sulfuric Acid (mls.) | 59.0 | 59.4 | 59.5 | 57.2 | 59.3 | 59.9 | 59.8 | 60.1 | 60.2 |
| pH | 7.63 | 7.62 | 7.64 | 7.62 | 7.62 | 7.62 | 7.63 | 7.64 | 7.65 |
| 40% Vulcanizer Dispersion | 17.5 | 17.5 | 17.5 | 17.5 | 17.5 | 17.5 | 17.5 | 17.5 | 17.5 |
| 3:1 Polymethoxy Alcohols | | 6 | | | | | | | |
| 5:1 Polymethoxy Alcohols | | | 6 | | | | | | |
| 10:1 Polymethoxy Alcohols | | | | 6 | | | | | |
| 15:1 Polymethoxy Alcohols | | | | | 6 | | | | |
| 20:1 Polymethoxy Alcohols | | | | | | 6 | | | |
| 5:1 Polyethoxy Alcohols | | | | | | | 6 | | |
| 10:1 Polyethoxy Alcohols | | | | | | | | 6 | |
| 15:1 Polyethoxy Alcohols | | | | | | | | | 6 |
| pH | 7.72 | 7.73 | 7.75 | 7.73 | 7.72 | 7.78 | 7.78 | 7.80 | 7.76 |
| Coagulation Point, °C.: | | | | | | | | | |
| After Preparation | 60 | 53 | 52 | 43 | 42 | 45 | 35 | 52 | 53 |
| After 24 Hours at 0-5° C. | 59 | 52 | 51 | 42 | 42 | 41 | 31 | 48 | 50 |

APPEARANCE OF LATEX

After preparation:
1. Good; fluid; smooth.
2. Good; fluid; smooth.
3. Good; fluid; smooth.
4–6. Good; fluid; smooth.
7. Good; fairly thick; smooth.
8. Good; fluid; smooth.
9. Good; fluid; smooth.

After 24 hours at 0–5° C.:
1. Good; fluid; smooth.
2. Good; fluid; smooth.
3–5. Good; fluid; smooth.
6. Good; slightly thick; smooth.
7. Good; thick; smooth; almost flocculated on top at first until shaken then fluid; smooth.
8. Good; fluid; smooth.
9. Small amount of polyethoxy alcohols at top with small amount of latex almost flocculated; good, fluid, smooth when shaken.

APPEARANCE OF COAGULATE

After preparation:
1–9. Good, fairly strong, smooth coagulate; not too easily pulled apart by hand.

After 24 hours at 0–5° C.:
1–9. Good, fairly strong, smooth coagulate; not too easily pulled apart by hand.

The coagulation points of compounded rubber latex heat-sensitized by 6% additions of various polymethoxy- or polyethoxy-1-alkanols (based on 100 parts of rubber latex solids) after preparation ranged from 35 to 53° C. as compared to 60° C. for the control. After standing for 24 hours at 0–5° C., the coagulation point of compounded latices heat-sensitized with the various polyalkoxy-1-alkanols seemed to show a slight drop in some cases and ranged from 31 to 52° C. as compared to 59° C. for the control.

The following dipping tests carried out on these compositions clearly illustrate the efficacy with which the various polyalkoxy-1-alkanols act to produce much thicker, smoother, less drippy coagulates when used as heat-sensitizers for natural rubber latex as compared to a control.

*Dipping tests*

APPEARANCE OF COAGULATES

| Composition | Appearance |
|---|---|
| 1 | ½₂–⅟₁₆ inch thick; thin, drippy, runny, fairly smooth coagulate. Little more than thin skin on tube. |
| 2–3 | ⅟₁₆ inch thick; fairly thick, slightly drippy, smooth, even coagulate. Somewhat better than 1. |
| 4–5 | ⅟₁₆–⅛ inch thick; thick, non-drippy, smooth, even coagulate. Much better than 1. |
| 6 | Almost ⅛ inch thick; thick, non-drippy, smooth, even coagulate. Very much better than 1. |
| 7 | ⅟₁₆–⅛ inch thick; thick, non-drippy, smooth, even coagulate. Much better than 1. (Note: The holding time was cut from 30 to 15 seconds because of the low coagulation point of this latex.) |
| 8–9 | ⅟₁₆ inch thick; fairly thick, smooth, even, drippy coagulate. Somewhat better than 1. |

MODE OF PREPARATION

A 20 x 150-mm. Pyrex test tube was half-filled with glycerine and a thermometer inserted. The test tube and contents were heated over a gas flame to a temperature of 90° C. immersed in the latex which had been stored in a refrigerator for 24 hours at 0–5° C. held for 30 seconds in the latex unless otherwise noted, and then withdrawn. Bottom temperature on withdrawing the test tube from the latex ranged from 75–80° C.

EXAMPLE III

The compositions listed in Table 3 were prepared in the same manner as given in Example II. The results obtained clearly show the improved results obtained when various individual members of different polyalkoxy-1-alkanol series are used as heat-sensitizers for a compounded natural rubber latex.

Table 3.—*Use of individual polyalkoxy-1-alkanols as heat-sensitizers for rubber latex*

| Composition | 1 | 2 | 3 | 4 | 5 | 6 | 7 | 8 |
|---|---|---|---|---|---|---|---|---|
| Natural Rubber Latex | 161.7 | 161.7 | 161.7 | 161.7 | 161.7 | 161.7 | 161.7 | 161.7 |
| 10% Polyoxyethylated Oleyl Alcohol | 20 | 20 | 20 | 20 | 20 | 20 | 20 | 20 |
| pH | 10.40 | 10.46 | 10.51 | 10.55 | 10.50 | 10.52 | 10.62 | 10.45 |
| 1.001 N Sulfuric Acid (mls.) | 60.0 | 60.4 | 60.3 | 60.8 | 61.1 | 61.0 | 60.8 | 61.5 |
| pH | 7.62 | 7.63 | 7.61 | 7.62 | 7.61 | 7.61 | 7.62 | 7.63 |
| 40% Vulcanizer Dispersion | 17.5 | 17.5 | 17.5 | 17.5 | 17.5 | 17.5 | 17.5 | 17.5 |
| 3,5,7-Trimethoxy-1-octanol | | 6 | | | | | | |
| 3,5,7,9,11-Pentamethoxy-1-dodecanol | | | 6 | | | | | |
| 3,5,7,9,11,13-Hexamethoxy-1-tetradecanol | | | | 6 | | | | |
| 3,5,7,9-Tetraethoxy-1-decanol | | | | | 6 | | | |
| 3-Octyloxy-1-butanol | | | | | | 6 | | 6 |
| 3,5,7,9 - Tetra - (2 - methoxyethoxy) - 1-decanol | | | | | | | 6 | |
| pH | 7.78 | 7.79 | 7.76 | 7.79 | 7.76 | 7.48 | 7.76 | 7.48 |
| Coagulation Point, °C.: | | | | | | | | |
| After Preparation | 60 | 56 | 53 | 53 | 52 | 47 | 57 | 47 |
| After 24 Hours at 0–5° C. | 60 | 55 | 52 | 52 | 54 | 49 | 56 | 49 |

APPEARANCE OF LATEX

After preparation:
1-8. Good; fluid; smooth.

After 24 hours at 0-5° C.
1-5. Good; fluid; smooth.
6. Flocculated until shaken then appears to be good, fluid, smooth.
7. Good; fluid; smooth.
8. Flocculated until shaken then appears to be good, fluid, smooth.

APPEARANCE OF COAGULATE

After preparation:
1-8. Good; fairly strong coagulate; not easily pulled apart by hand.

After 24 hours at 0-5° C.:
1-8. Good; fairly strong coagulate; not easily pulled apart by hand.

*Dipping Tests*

APPEARANCE OF COAGULATES

| Composition | Appearance |
| --- | --- |
| 1 | 1/32-1/16 inch thick; thin, even, smooth, drippy coagulate. Little more than thin skin on tube. |
| 2-4 | 1/16 inch thick; fairly thick, smooth, even, slightly drippy coagulate. Somewhat better than 1. |
| 5-6 | 1/16-1/8 inch thick; thick, smooth, even, slightly drippy coagulate. Much better than 1. |
| 7 | 1/16 inch thick; fairly thick, smooth, even, drippy coagulate. Somewhat better than 1. |
| 8 | 1/16-1/8 inch thick; thick, smooth, even, slightly drippy coagulate. Somewhat better than 1. |

MODE OF PREPARATION

A 20 x 150-mm. Pyrex test tube was half-filled with glycerine and a thermometer inserted. The test tube and contents were heated over a gas flame to a temperature of 90° C., immersed in the latex which had been stored in a refrigerator for 24 hours at 0-5° C., held for 30 seconds in the latex, and then withdrawn. Bottom temperature on withdrawing the test tube from the latex ranged from 75-78° C.

From the foregoing tables it is clearly apparent that the individual and mixed polyalkoxy-1-alkanols can be readily employed to heat-sensitize natural rubber latex for the production of dipped goods, impregnation of paper, preparation of sponge rubber, etc.

We claim:

1. A rubber latex composition adaptable for the manufacture of rubber articles by coagulation at a temperature between 30°-130° C., containing in a heat-sensitizing amount at least one polyalkoxy-1-alkanol characterized by the following general formula

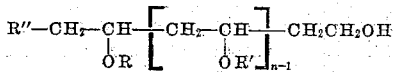

where R and R' represent a member selected from the class consisting of alkyl of 1 to 4 carbon atoms and alkoxyalkyl groups of 3 to 7 carbon atoms, R" represents a member selected from the class consisting of hydrogen, alkyl of 1 to 4 carbon atoms and alkoxyalkyl groups of 3 to 7 carbon atoms, and $n$ represents a positive integer of 1 to 40.

2. A rubber latex composition according to claim 1 wherein the polyalkoxy-1-alkanol has the following formula

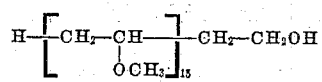

3. A rubber latex composition according to claim 1 wherein the polyalkoxy-1-alkanol has the following formula

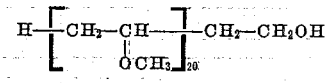

4. A rubber latex composition according to claim 1 wherein the polyalkoxy-1-alkanol has the following formula

5. A rubber latex composition according to claim 1 wherein the polyalkoxy-1-alkanol has the following formula

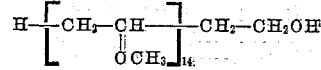

6. A rubber latex composition according to claim 1 wherein the polyalkoxy-1-alkanol has the following formula

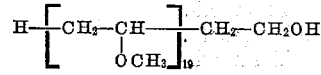

7. A process for the preparation of rubber goods from a compound rubber latex which comprises heat-sensitizing the said latex by the addition of a heat-sensitizing amount of at least one polyalkoxy-1-alkanol characterized by the following general formula

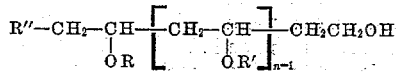

where R and R' represent a member selected from the class consisting of alkyl of 1 to 4 carbon atoms and alkoxyalkyl groups of 3 to 7 carbon atoms, R" represents a member selected from the class consisting of hydrogen, alkyl of 1 to 4 carbon atoms and alkoxyalkyl groups of 3 to 7 carbon atoms, and $n$ represents a positive integer of 1 to 40 and coagulating the heat-sensitized latex at a temperature between 30°-130° C.

8. A process according to claim 7 wherein the polyalkoxy-1-alkanol has the following formula

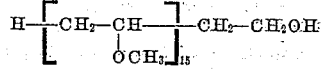

9. A process according to claim 7 wherein the polyalkoxy-1-alkanol has the following formula

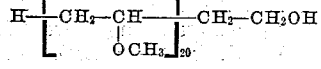

10. A process according to claim 7 wherein the polyalkoxy-1-alkanol has the following formula

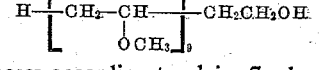

11. A process according to claim 7 wherein the polyalkoxy-1-alkanol has the following formula

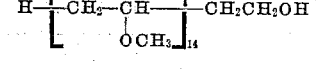

12. A process according to claim 7 wherein the polyalkoxy-1-alkanol has the following formula

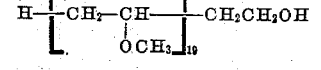

No references cited.